(12) United States Patent
Geibel et al.

(10) Patent No.: US 10,881,990 B2
(45) Date of Patent: Jan. 5, 2021

(54) FILTER MEDIA RETAINER AND UNDERDRAIN SYSTEM HAVING A FILTER MEDIA RETAINER

(71) Applicant: Xylem Water Solutions Zelienople LLC, Zelienople, PA (US)

(72) Inventors: John L. Geibel, Butler, PA (US); Robert J. Green, Butler, PA (US); Howard J. Sweeney, Cranberry Township, PA (US); Robert Lee Wiley, Jr., Ellwood City, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 197 days.

(21) Appl. No.: 15/982,369

(22) Filed: May 17, 2018

(65) Prior Publication Data

US 2018/0333660 A1    Nov. 22, 2018

Related U.S. Application Data

(60) Provisional application No. 62/507,555, filed on May 17, 2017.

(51) Int. Cl.
*B01D 24/24* (2006.01)
*B01D 24/46* (2006.01)
*B01D 24/22* (2006.01)

(52) U.S. Cl.
CPC ......... *B01D 24/4636* (2013.01); *B01D 24/22* (2013.01); *B01D 24/24* (2013.01)

(58) Field of Classification Search
CPC ..... B01D 24/22; B01D 24/24; B01D 24/4636
See application file for complete search history.

(56) References Cited

U.S. PATENT DOCUMENTS

| | | |
|---|---|---|
| 4,196,079 A | 4/1980 | Ward |
| 4,331,542 A | 5/1982 | Emrie |
| 5,118,419 A | 6/1992 | Evans et al. |
| 5,489,388 A | 2/1996 | Brown et al. |
| 5,639,384 A | 6/1997 | Brown et al. |
| 5,865,999 A | 2/1999 | Shea et al. |
| 5,976,370 A | 11/1999 | Medworth |
| 6,090,284 A | 7/2000 | Melber et al. |
| 6,143,188 A | 11/2000 | Jantsch, Sr. et al. |
| 6,797,166 B1 | 9/2004 | Hambley et al. |
| 6,843,920 B1 | 1/2005 | Darmawan |
| 7,063,787 B2 | 6/2006 | Jackson et al. |
| 7,090,771 B2 | 8/2006 | Dyson et al. |

(Continued)

*Primary Examiner* — Matthew O Savage
(74) *Attorney, Agent, or Firm* — The Webb Law Firm

(57) ABSTRACT

A filter media retainer has a plate having a first end wall, a second end wall, and a pair of longitudinal sidewalls connected to opposing sides of the first end wall and the second end wall. The plate has a top surface opposite a bottom surface. A plurality of hopper-shaped compartments are formed on the top surface and have a first sloped wall and a second sloped wall angled toward the first sloped wall in a direction from the top surface toward the bottom surface. The plate further has a top sidewall on the top surface of the plate separating adjacent hopper-shaped compartments from each other. The plate further has at least one first slot extending through at least one of the first sloped wall and the second sloped wall, and at least one second slot extending through the top sidewall.

23 Claims, 12 Drawing Sheets

(56) References Cited

U.S. PATENT DOCUMENTS

| | | |
|---|---|---|
| 7,105,084 B1 | 9/2006 | Hilton, Jr. et al. |
| 7,138,056 B2 | 11/2006 | Hambley et al. |
| 7,192,521 B2 | 3/2007 | St. Germain |
| 7,410,578 B2 | 8/2008 | Hambley et al. |
| 7,588,686 B2 | 9/2009 | Jensen |
| 8,343,343 B2 | 1/2013 | Kadakia et al. |
| 8,409,437 B2 | 4/2013 | Roberts et al. |
| 8,491,787 B2 | 7/2013 | Wolf et al. |
| 8,871,093 B2 | 10/2014 | Ball et al. |
| 8,889,003 B2 | 11/2014 | Berkebile et al. |
| 9,138,665 B2 | 9/2015 | Ball et al. |
| 9,320,991 B2 | 4/2016 | Meurer |
| 2005/0133434 A1 | 6/2005 | Hambley et al. |
| 2011/0073549 A1* | 3/2011 | Geibel .................. B01D 29/62 210/793 |
| 2013/0180906 A1* | 7/2013 | Ball ...................... G06Q 50/22 210/232 |
| 2014/0166567 A1 | 6/2014 | Sweeney et al. |
| 2014/0217039 A1 | 8/2014 | Geibel et al. |
| 2015/0231534 A1 | 8/2015 | Berkebile et al. |
| 2015/0273364 A1 | 10/2015 | Roberts et al. |
| 2016/0193550 A1 | 7/2016 | Meurer |
| 2016/0243467 A1 | 8/2016 | Sweeney et al. |
| 2018/0021702 A1 | 1/2018 | Sweeney et al. |

* cited by examiner

FILTER MEDIA RETAINER AND UNDERDRAIN SYSTEM HAVING A FILTER MEDIA RETAINER

CROSS-REFERENCE TO RELATED APPLICATIONS

This application claims priority to U.S. Provisional Application No. 62/507,555, filed on May 17, 2017 and titled "Filter Media Retainer and Underdrain System Having a Filter Media Retainer", the disclosure of which is incorporated herein by reference in its entirety.

BACKGROUND OF THE INVENTION

Field of the Invention

The present invention relates to filter media retainers and underdrain systems having filter media retainers.

Description of Related Art

Gravity filters are used to separate suspended solids from water. The main components of gravity filters are filtering media and underdrain blocks. Underdrain blocks are generally square, rectangular, or triangular in cross section and have a long longitudinal axis as compared to their cross section. They are attached end-to-end to form long sections called laterals, or are extruded to length, or are fabricated to length. Filter underdrain laterals are typically laid on the floor of the filter tank one next to the other in parallel rows to define gas and liquid flow conduits below a bed of filtering media.

The gas and liquid flow conduits make possible the collection of filtered liquid during filtration and the distribution of gas and liquid for backwash. Typically, a common main conduit (known as a "flume") is located immediately next to or under the filter tank to collect the effluent filtered liquid from the underdrain laterals during filtration and to distribute gas and/or liquid to the underdrain laterals during gas (typically air) or liquid (typically water) backwash.

Filter media is also poured over the filter underdrain laterals to capture dirt particles from a liquid being filtered as the liquid passes through the filter media. The filter media can be supported by a filter media retainer so that it will not pass into the underdrain block or collection system. The filter media retainer is typically a flat and/or shallow slotted plate or plurality of plates that are placed on top of the underdrain laterals. The filter media retainer has a plurality of slots to allow for the passage of gas or liquid from the underdrain laterals into the filter media during the backwash process.

While such filter media retainers help retain media on top of the underdrain lateral, they typically do not distribute air uniformly with a low air pressure differential, which is necessary to efficiently distribute both water and air during a backwashing process. In addition, it is difficult to manufacture large single piece plastic filter media retainers that have small slots and which also have sufficient strength to prevent distortion of the slots. Thus, it is desirable to provide a filter media retainer that contains fine slots that do not distort under pressure and which also provide a low air pressure differential.

SUMMARY OF THE INVENTION

In accordance with one embodiment of the present invention, a filter media retainer may have a plate having a first end wall, a second end wall, and a pair of longitudinal sidewalls connected to opposing sides of the first end wall and the second end wall. The plate may have a top surface opposite a bottom surface, a plurality of hopper-shaped compartments on the top surface and a first sloped wall and a second sloped wall angled toward the first sloped wall in a direction from the top surface toward the bottom surface. A top sidewall on the top surface of the plate may separate adjacent hopper-shaped compartments from each other. The plate further may have at least one first slot extending through at least one of the first sloped wall and the second sloped wall and at least one second slot extending through the top sidewall. The at least one first slot and the at least one second slot may be configured to allow a passage of filtered water in a direction from the top surface to the bottom surface, and allow a passage of a backwash fluid in a direction from the bottom surface to the top surface.

In accordance with another embodiment of the present invention, the at least one first slot may be a plurality of first slots, with a first portion of the plurality of first slots extending through the first sloped wall and a second portion of the plurality of first slots extending through the second sloped wall. The first portion of the plurality of first slots may be connected to the second portion of the plurality of first slots at an intersection point between the first sloped wall and the second sloped wall. The first portion of the plurality of first slots may be disconnected to the second portion of the plurality of first slots. The at least one first slot may extend in a direction substantially parallel relative to a major longitudinal axis of the plate. The at least one first slot may have a uniform width in a direction from the top surface toward the bottom surface. A width of the at least one first slot on the bottom surface may be smaller than a width of the at least one first slot on the top surface.

In accordance with another embodiment of the present invention, the at least one second slot may extend in a direction substantially perpendicular relative to a major longitudinal axis of the plate. The at least one second slot may have a uniform width in a direction from the top surface toward the bottom surface. A width of the at least one second slot on the bottom surface may be smaller than a width of the at least one second slot on the top surface. A width of the at least one first slot may be smaller than a width of the at least one second slot. The at least one first slot may be separated from the at least one second slot by a distance of about 0.1 inches to about 1.0 inches in a height direction of the filter media retainer.

In accordance with another embodiment of the present invention, the at least one second slot may be a plurality of second slots in a staggered arrangement along the top sidewall. The plate may further have at least one longitudinal rib extending between the first end wall and the second end wall in a direction substantially parallel with the pair of longitudinal sidewalls. The plate may further have at least one transverse rib extending between the pair of longitudinal sidewalls in a direction substantially parallel with the first end wall and the second end wall. The plate may further have a plurality of mounting portions on the top surface and disposed along a periphery of the plate.

In accordance with another embodiment of the present invention, a filter system for filtering a liquid containing particles may have an underdrain block with a top wall, a bottom wall, and a pair of side walls extending between the top wall and the bottom wall to define an interior chamber, and a filter media retainer mountable on the top wall of the underdrain. The filter media retainer may have a plate having a first end wall, a second end wall, and a pair of longitudinal sidewalls connected to opposing sides of the first end wall and the second end wall. The plate may have a top surface opposite a bottom surface, a plurality of hopper-shaped compartments on the top surface and having a first sloped wall and a second sloped wall angled toward the first sloped wall in a direction from the top surface toward the bottom surface, and a top sidewall on the top surface of the plate separating adjacent hopper-shaped compartments from each other. The plate further may have at least one first slot extending through at least one of the first sloped wall and the second sloped wall and at least one second slot extending through the top sidewall. The at least one first slot and the at least one second slot may be configured to allow a passage of filtered water in a direction from the top surface to the bottom surface, and allow a passage of a backwash fluid in a direction from the bottom surface to the top surface.

In accordance with another embodiment of the present invention, the top wall of the underdrain block may have a plurality of dispersion apertures that are in fluid communication with the at least one first slot and the at least one second slot of the filter media retainer. The filter media retainer may have at least one rib positioned over at least one of the plurality of dispersion apertures to direct backwash fluid to the at least one first slot and the at least one second slot. A width of the at least one first slot on the bottom surface may be smaller than a width of the at least one first slot on the top surface. A width of the at least one second slot on the bottom surface may be smaller than a width of the at least one second slot on the top surface. A width of the at least one first slot may be smaller than a width of the at least one second slot. The at least one first slot may be separated from the at least one second slot by a distance of about 0.1 inches to about 1.0 inches in a height direction of the filter media retainer.

In accordance with further embodiments of the present invention, a filter media retainer plate and an underdrain system having a filter media retainer plate can be characterized by one or more of the following clauses:

Clause 1. A filter media retainer comprising: a plate having a first end wall, a second end wall, and a pair of longitudinal sidewalls connected to opposing sides of the first end wall and the second end wall, the plate having a top surface opposite a bottom surface; a plurality of hopper-shaped compartments on the top surface and having a first sloped wall and a second sloped wall angled toward the first sloped wall in a direction from the top surface toward the bottom surface; a top sidewall on the top surface of the plate separating adjacent hopper-shaped compartments from each other; at least one first slot extending through at least one of the first sloped wall and the second sloped wall; and at least one second slot extending through the top sidewall, wherein the at least one first slot and the at least one second slot are configured to allow a passage of filtered water in a direction from the top surface to the bottom surface, and allow a passage of a backwash fluid in a direction from the bottom surface to the top surface.

Clause 2. The filter media retainer of clause 1, wherein the at least one first slot is a plurality of first slots, with a first portion of the plurality of first slots extending through the first sloped wall and a second portion of the plurality of first slots extending through the second sloped wall.

Clause 3. The filter media retainer of clause 2, wherein the first portion of the plurality of first slots is connected to the second portion of the plurality of first slots at an intersection point between the first sloped wall and the second sloped wall.

Clause 4. The filter media retainer of clause 2 or 3, wherein the first portion of the plurality of first slots is disconnected to the second portion of the plurality of first slots.

Clause 5. The filter media retainer of any of clauses 1-4, wherein the at least one first slot extends in a direction substantially parallel relative to a major longitudinal axis of the plate.

Clause 6. The filter media retainer of any of clauses 1-5, wherein the at least one first slot has a uniform width in a direction from the top surface toward the bottom surface.

Clause 7. The filter media retainer of any of clauses 1-6, wherein a width of the at least one first slot on the bottom surface is smaller than a width of the at least one first slot on the top surface.

Clause 8. The filter media retainer of any of clauses 1-7, wherein the at least one second slot extends in a direction substantially perpendicular relative to a major longitudinal axis of the plate.

Clause 9. The filter media retainer of any of clauses 1-8, wherein the at least one second slot has a uniform width in a direction from the top surface toward the bottom surface.

Clause 10. The filter media retainer of any of clauses 1-9, wherein a width of the at least one second slot on the bottom surface is smaller than a width of the at least one second slot on the top surface.

Clause 11. The filter media retainer of any of clauses 1-10, wherein a width of the at least one first slot is smaller than a width of the at least one second slot.

Clause 12. The filter media retainer of any of clauses 1-11, wherein the at least one first slot is separated from the at least one second slot by a distance of about 0.1 inches to about 1.0 inches in a height direction of the filter media retainer.

Clause 13. The filter media retainer of any of clauses 1-12, wherein the at least one second slot is a plurality of second slots in a staggered arrangement along the top sidewall.

Clause 14. The filter media retainer of any of clauses 1-13, further comprising at least one longitudinal rib extending between the first end wall and the second end wall in a direction substantially parallel with the pair of longitudinal sidewalls.

Clause 15. The filter media retainer of any of clauses 1-14, further comprising at least one transverse rib extending between the pair of longitudinal sidewalls in a direction substantially parallel with the first end wall and the second end wall.

Clause 16. The filter media retainer of any of clauses 1-15, further comprising a plurality of mounting portions on the top surface and disposed along a periphery of the plate.

Clause 17. A filter system for filtering a liquid containing particles, the filter system comprising: an underdrain block comprising a top wall, a bottom wall, and a pair of side walls extending between the top wall and the bottom wall to define an interior chamber, and a filter media retainer mountable on the top wall of the underdrain, the filter media retainer comprising: a plate having a first end wall, a second end wall, and a pair of longitudinal sidewalls connected to opposing sides of the first end wall and the second end wall, the plate having a top surface opposite a bottom surface; a plurality of hopper-shaped compartments on the top surface and having a first sloped wall and a second sloped wall angled toward the first sloped wall in a direction from the top surface toward the bottom surface; a top sidewall on the top surface of the plate separating adjacent hopper-shaped compartments from each other; at least one first slot extending through at least one of the first sloped wall and the second sloped wall; and at least one second slot extending through the top sidewall, wherein the at least one first slot and the at least one second slot are configured to allow a passage of filtered water in a direction from the top surface to the bottom surface, and allow a passage of a backwash fluid in a direction from the bottom surface to the top surface.

Clause 18. The filter system of clause 17, wherein the top wall of the underdrain block has a plurality of dispersion apertures that are in fluid communication with the at least one first slot and the at least one second slot of the filter media retainer.

Clause 19. The filter system of clause 17 or clause 18, wherein the filter media retainer comprises at least one rib positioned over at least one of the plurality of dispersion apertures to direct backwash fluid to the at least one first slot and the at least one second slot.

Clause 20. The filter system of any of clauses 17-19, wherein a width of the at least one first slot on the bottom surface is smaller than a width of the at least one first slot on the top surface.

Clause 21. The filter system of any of clauses 17-20, wherein a width of the at least one second slot on the bottom surface is smaller than a width of the at least one second slot on the top surface.

Clause 22. The filter system of any of clauses 17-21, wherein a width of the at least one first slot is smaller than a width of the at least one second slot.

Clause 23. The filter system of any of clauses 17-22, wherein the at least one first slot is separated from the at least one second slot by a distance of about 0.1 inches to about 1.0 inches in a height direction of the filter media retainer.

The features that characterize the present invention are pointed out with particularity in the claims, which are annexed to and form a part of this disclosure. These and other features of the invention, its operating advantages, and the specific objects obtained by its use will be more fully understood from the following detailed description in which non-limiting examples of the invention are illustrated and described.

BRIEF DESCRIPTION OF THE DRAWINGS

In FIGS. 1-11, like characters refer to the same components and elements, as the case may be, unless otherwise stated.

DETAILED DESCRIPTION OF THE INVENTION

Figure 1:
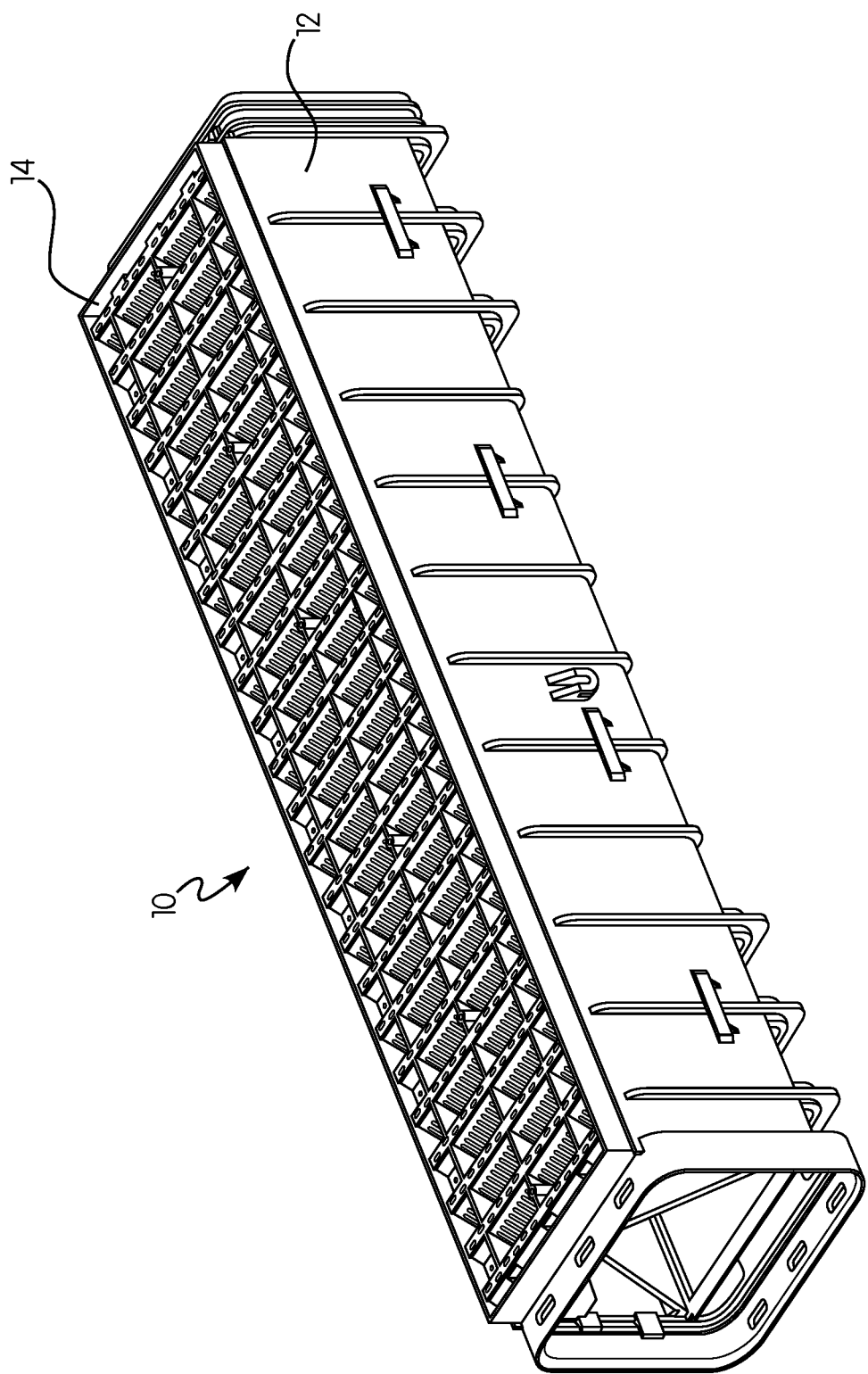
FIG. 1 is a perspective view of an underdrain system having an underdrain block and a filter media retainer according to an embodiment of the present invention.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "adjacent" means proximate to but not in direct contact with.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

Figure 2:
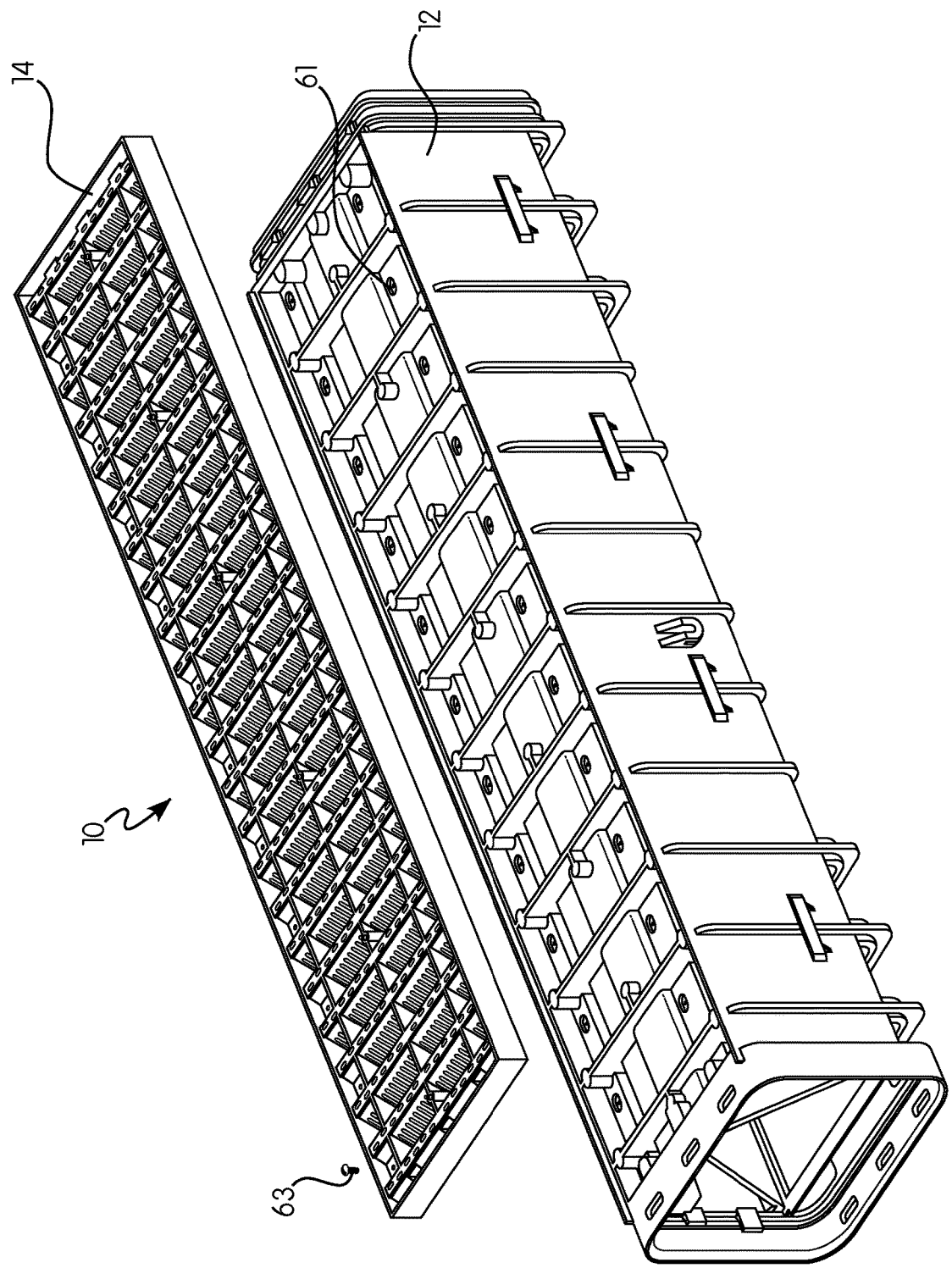
FIG. 2 is an exploded perspective view of FIG. 1.

Referring to FIGS. 1-2, a gravity or pressure filter assembly or filter system 10 (hereinafter referred to as "filter system 10") includes an underdrain assembly or underdrain block 12, a filter media retainer 14 which is adapted to be connected to the underdrain block 12 using a plurality of fasteners (not shown). In some examples, the underdrain block 12 could be part of an underdrain assembly, such as the underdrain assembly described in U.S. Pat. No. 5,639,384, the entire disclosure of which is incorporated by reference herein in its entirety. Non-limiting examples of other suitable underdrain assemblies are also described in United States Patent Application Publication No. 2014/0166567 and U.S. Pat. No. 5,489,388, both of which are incorporated by reference herein in their entirety.

The filter media retainer 14 is mounted on top of the underdrain block 12 such that a bottom portion of the filter media retainer 14 is placed on a top portion of the underdrain block 12. A layer, or multiple layers, of filter media (not shown) is poured on top of the filter media retainer 14. The filter media is configured to remove and/or capture undesirable particles, such as dirt, debris, chemical and/or biological contaminants, from a liquid flowing through the filter system 10. The filter media may be of any type known to be suitable by those having ordinary skill in the art, such as multiple layers of sand and gravel.

The filter media retainer 14 is configured to prevent the filter media from entering the underdrain block 12, while allowing filtered water to enter the underdrain block 12 through various openings in the filter media retainer 14 during a filtration operation, as described herein. The openings in the filter media retainer 14 are further configured to allow the passage of a backwash fluid from the underdrain block 12 into the filter media, such as during a backwash operation. As used herein, "backwashing" or "backwash operation" refers to a process in which clean backwash fluid, such as a gas (e.g, air), a liquid (e.g., water), or a mixture of gas and liquid, is pumped, either separately, or concurrently, into the underdrain block 12 to remove undesirable or unwanted materials from the filtering media. During such operation, the backwash fluid is directed in a generally vertical direction through the underdrain block 12 and the filter media retainer 14 so that the backwash fluid scours a top surface of the filter media retainer 14 and prevents the build-up of biological and/or chemical scaling on the filter media retainer 14.

Figure 3:
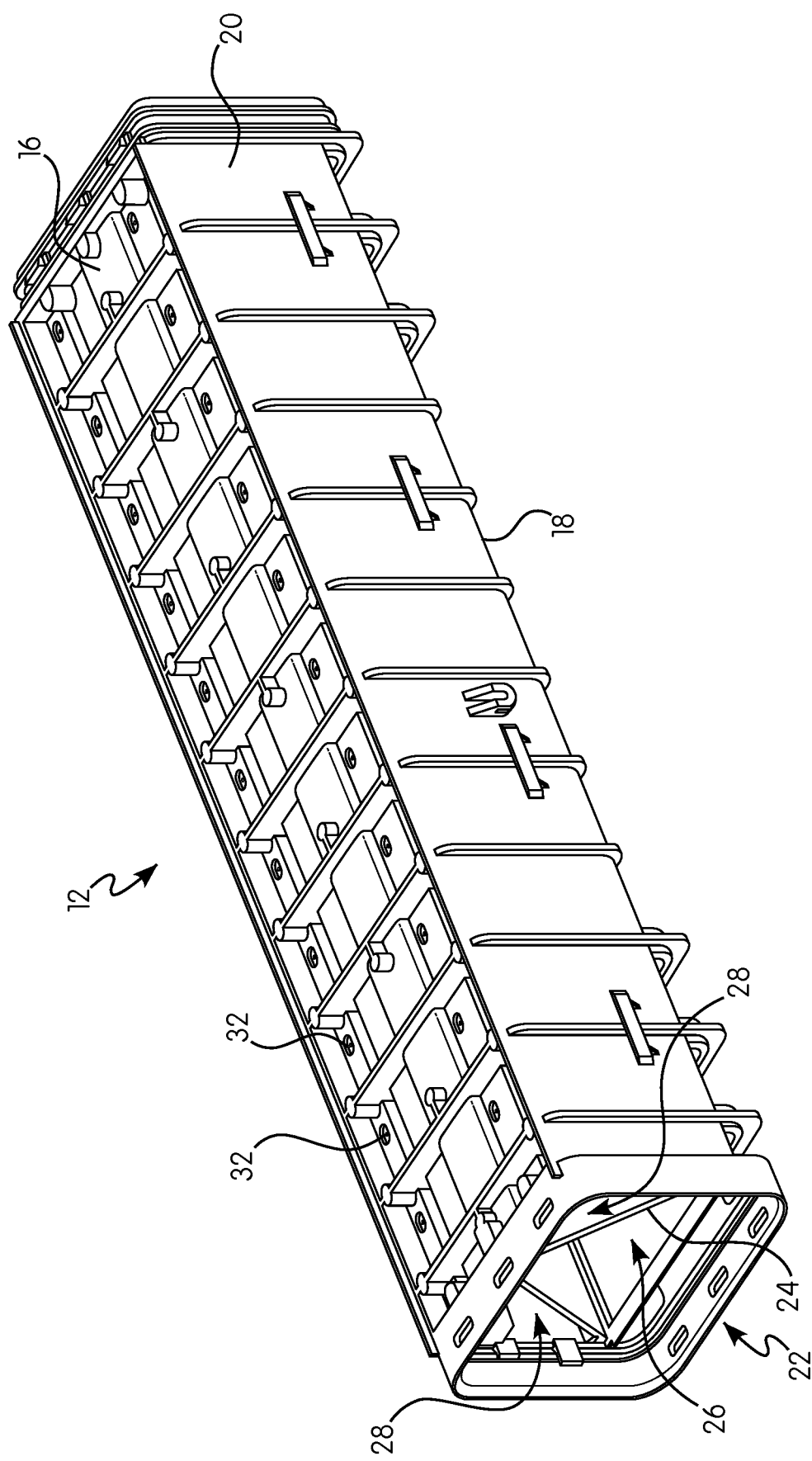
FIG. 3 is a perspective view of the underdrain block of FIG. 1 shown without the filter media retainer.

With reference to FIG. 3, the underdrain block 12 has a plurality of exterior walls including a top wall 16, a bottom wall 18, and a pair of side walls 20 extending between the top wall 16 and the bottom wall 18 to define an interior chamber 22. One or more internal walls 24 divide the interior chamber 22 into a primary horizontal chamber 26 and two secondary horizontal chambers 28 positioned on opposite sides of the primary horizontal chamber 26. A plurality of channels are provided on the internal walls 24 to provide fluid communication between the primary horizontal chamber 26 and the secondary horizontal chambers 28. The top wall 16 has a plurality of dispersion apertures 32 extending in a longitudinal direction of the underdrain block 12. During a filtration operation, filtered water is passed through the filtering media and the filter media retainer 14 before passing through the dispersion apertures 32 and into the internal chambers 26, 28. During a backwashing operation, a backwash fluid is pumped through the dispersion apertures 32 of the underdrain block 12 and through the filter media retainer 14 to remove undesirable or unwanted materials from the filter media.

Figure 4:
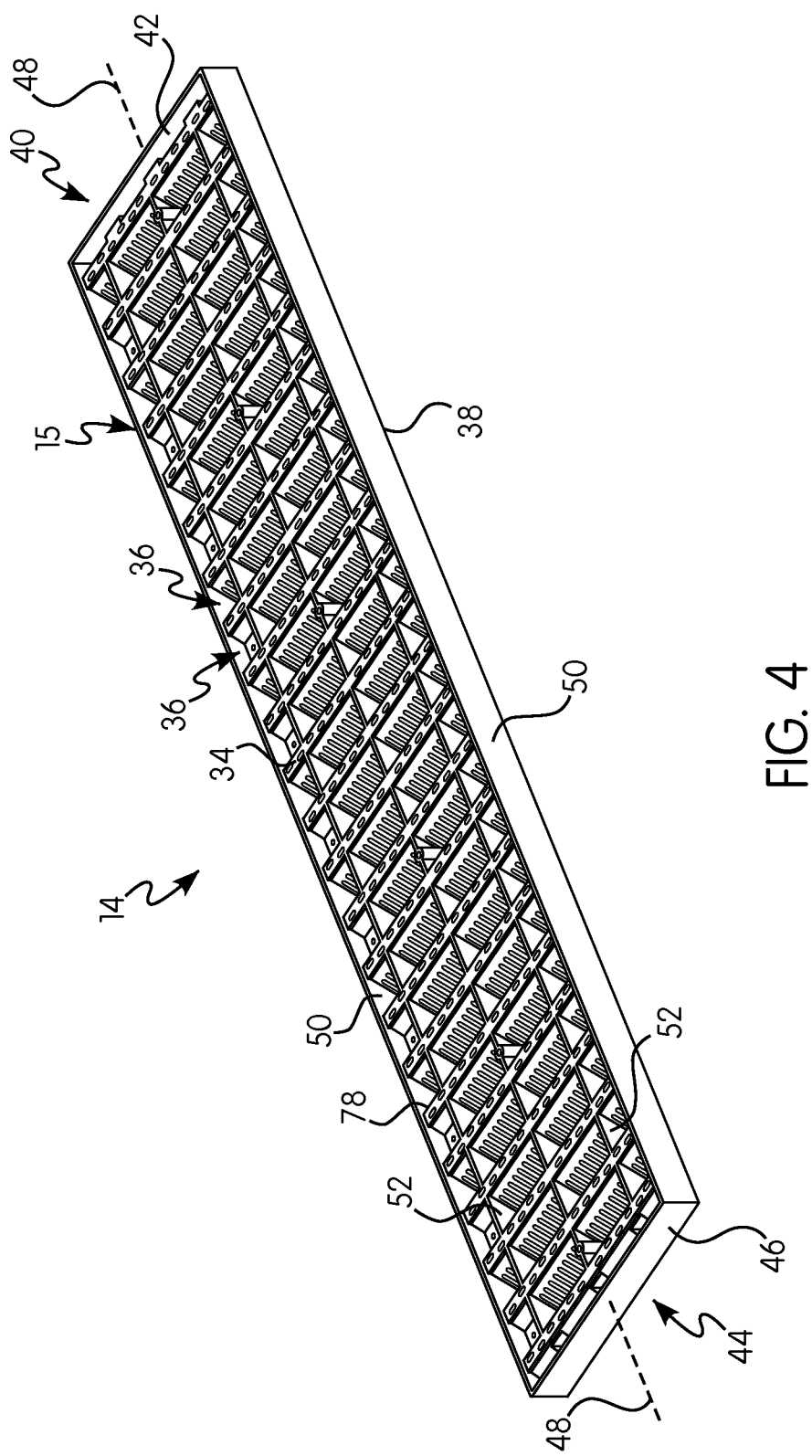
FIG. 4 is a top perspective view of the filter media retainer of FIG. 1 shown without the underdrain block.
Figure 7:
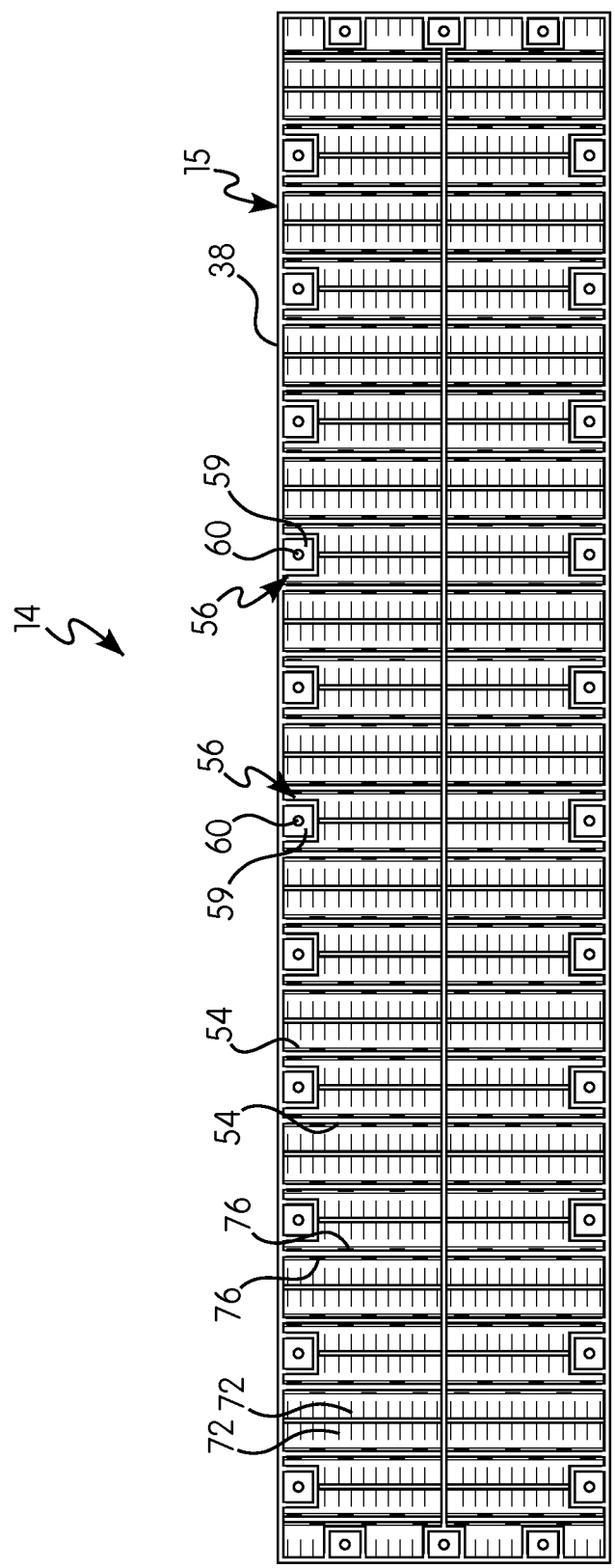
FIG. 7 is a bottom view of the filter media retainer shown in FIG. 4.

With reference to FIG. 4, the filter media retainer 14 is configured as a plate 15 having a top surface 34 defining at least one filter media chamber 36 and an opposing bottom surface 38 (also shown in FIG. 7). The plate 15 is configured to extend longitudinally between a first end and a second end of the top wall 16 of the underdrain block 12 (shown in FIG. 1) and laterally between the side walls 20 of the underdrain block 12 (shown in FIG. 1). The plate 15 has a first end 40 defined by a first end wall 42 that is separated from an opposing second end 44 defined by a second end wall 46 along a major longitudinal axis 48. In some examples, the first end wall 42 is oriented substantially parallel to the second end wall 46. In other examples, the first end wall 42 is angled at a non-parallel angle relative to the second end wall 46.

With continued reference to FIG. 4, the plate 15 further has a pair of longitudinal walls 50 connected to opposing sides of the first end wall 42 and the second end wall 46. In some examples, the longitudinal walls 50 are oriented substantially parallel to each other and substantially perpendicular to the first end wall 42 and the second end wall 46. In other examples, the longitudinal walls 50 are angled at a non-parallel angle relative to each other and/or a non-perpendicular angle relative to the first end wall 42 and the second end wall 46. The first end wall 42, the pair of longitudinal walls 50, and the second end wall 46 define an outer perimeter of the filter media retainer plate 15.

With continued reference to FIG. 4, the plate 15 further has at least one longitudinal rib 52 extending between the first end wall 42 and the second end wall 46 and substantially parallel to the longitudinal sidewalls 50 and the major longitudinal axis 48. In some examples, the at least one longitudinal rib 52 may extend at an angle relative to the longitudinal sidewalls 50 and the major longitudinal axis 48. In some examples, the at least one longitudinal rib 52 may be directly connected to the first end wall 42 and the second end wall 46, or the at least one longitudinal rib 52 may be offset from the first end wall 42 and the second end wall 46. In some examples, a plurality of longitudinal ribs 52 are spaced apart from one another along a lateral or transverse width of the first end wall 42 and the second end wall 46. The plurality of longitudinal ribs 52 may have equal or unequal spacing therebetween. In some examples, the at least one longitudinal rib 52 improves the rigidity of the filter media retainer 14 and improves the flow distribution of the backwash fluid during the backwash operation, as discussed herein. In certain examples, as shown in FIGS. 7-8, at least one longitudinal rib 52 can extend through a thickness of the filter media retainer 14, such as from the top surface 34, through the filter media chamber 36, and to the bottom surface 38 of the filter media retainer 14.

With reference to FIG. 7, the plate 15 further has at least one transverse rib 54 extending between the longitudinal sidewalls 50 in a direction substantially perpendicular to the longitudinal sidewalls 50 and the major longitudinal axis 48. In some examples, the at least one transverse rib 54 may extend between the longitudinal sidewalls 50 at an angle relative to the longitudinal sidewalls 50 and the major longitudinal axis 48. The at least one transverse rib 54 may be directly connected to the longitudinal sidewalls 50 or the at least one transverse rib 54 may be offset from the longitudinal sidewalls 50. In some examples, a plurality of transverse ribs 54 are spaced apart from one another along a longitudinal length of the longitudinal sidewalls 50. The plurality of transverse ribs 54 may be have equal or unequal spacing therebetween. In some examples, the at least one transverse rib 54 improves the rigidity of the filter media retainer 14 and improves the flow distribution of the backwash fluid during the backwash operation, as discussed herein.

Figure 8:
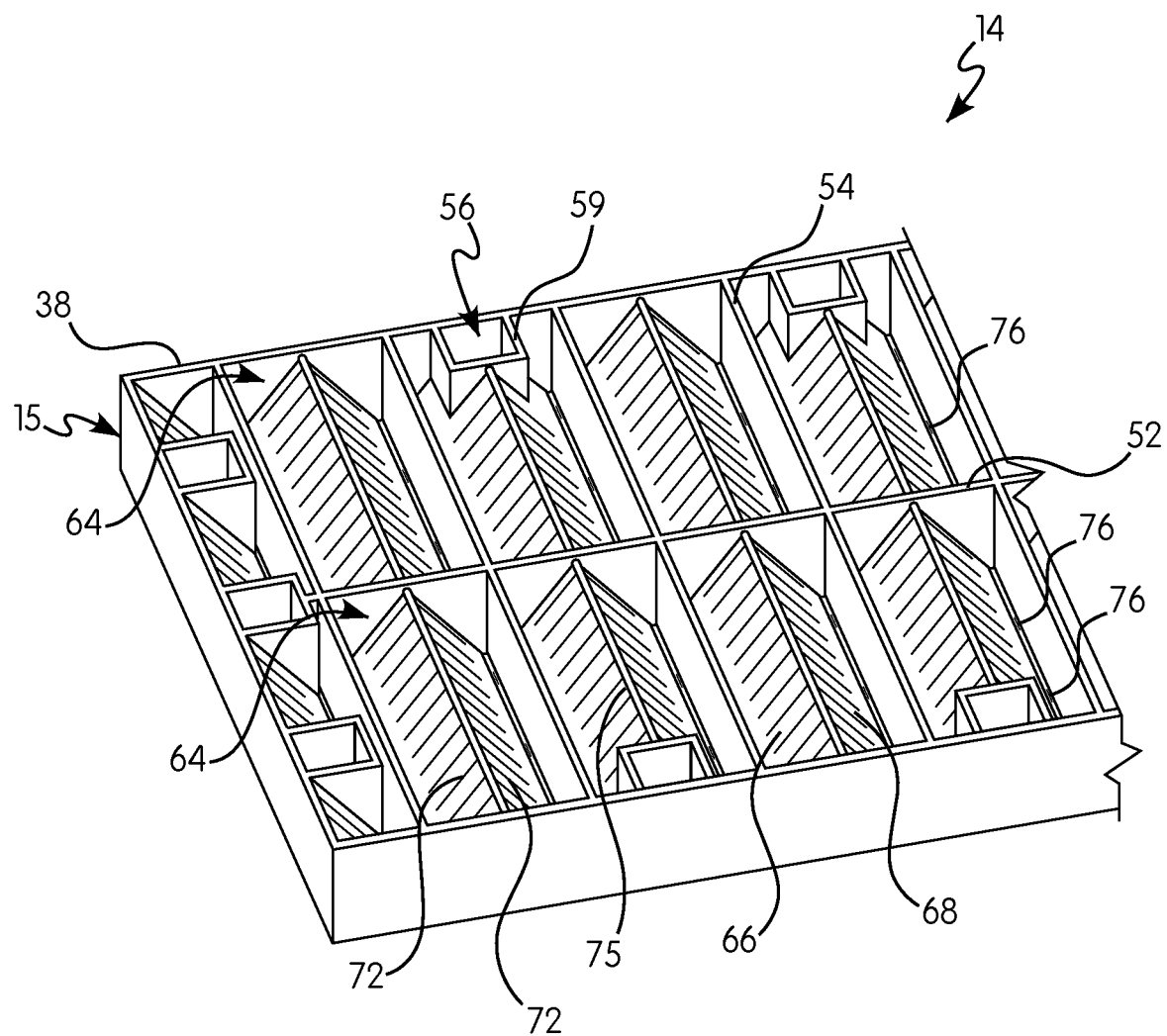
FIG. 8 is an enlarged perspective view of FIG. 7.

In certain examples, as shown in FIGS. 7-8, at least one transverse rib 54 can extend through a thickness of the filter media retainer 14, such as from the bottom surface 38, through the filter media chamber 36, and to the top surface 34. In some examples, a first end 71 of the at least one transverse rib 54 at the bottom surface 38 may be free standing, while a second end 74 of the at least one transverse rib 54 is connected to the top surface 34 of the filter media retainer 14. In this manner, the at least one transverse rib 54 may have a substantially T-shaped structure, with an upper portion at the second end 74 of the at least one transverse rib 54 connected to at least a portion of the top surface 34 of the filter media retainer 14, such as the top sidewall 78 shown in FIG. 6. In certain embodiments, a width of the top surface 34 at the second end 74 of the at least one transverse rib 54 may be within a range of from a ¼ inch to 2 inches, or from a ¼ inch to 1 inch, or from a ¼ inch to ¾ inch. For example, the width of the top surface 34 can be ⅜ inch.

Figure 11:
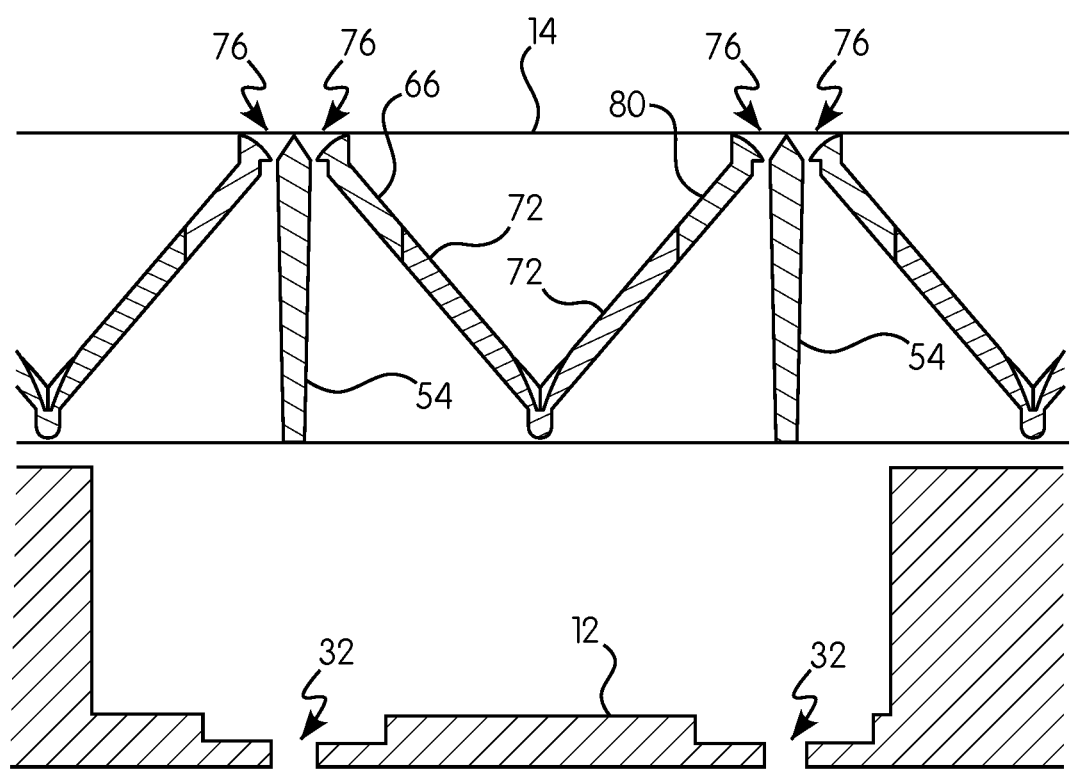
FIG. 11 is a cross-sectional view of the filter media retainer positioned on the underdrain block.

The arrangement of the at least one longitudinal rib 52 and the at least one transverse rib 54 increases the strength of the plate 15 to prevent distortion of the slots extending therethrough due to pressure differentials, as described herein. In certain examples, at least one longitudinal rib 52 and the at least one transverse rib 54 form a strong honey-comb structure that prevents distortion to the slots due to pressure differentials. Further, as shown in FIG. 11, it was found that the at least one longitudinal rib 52 and the at least one transverse rib 54 can segregate the air chamber formed directly above the dispersion apertures 32 of the underdrain block 12 to improve overall air distribution to the first and second slots, as described herein.

Figure 5:
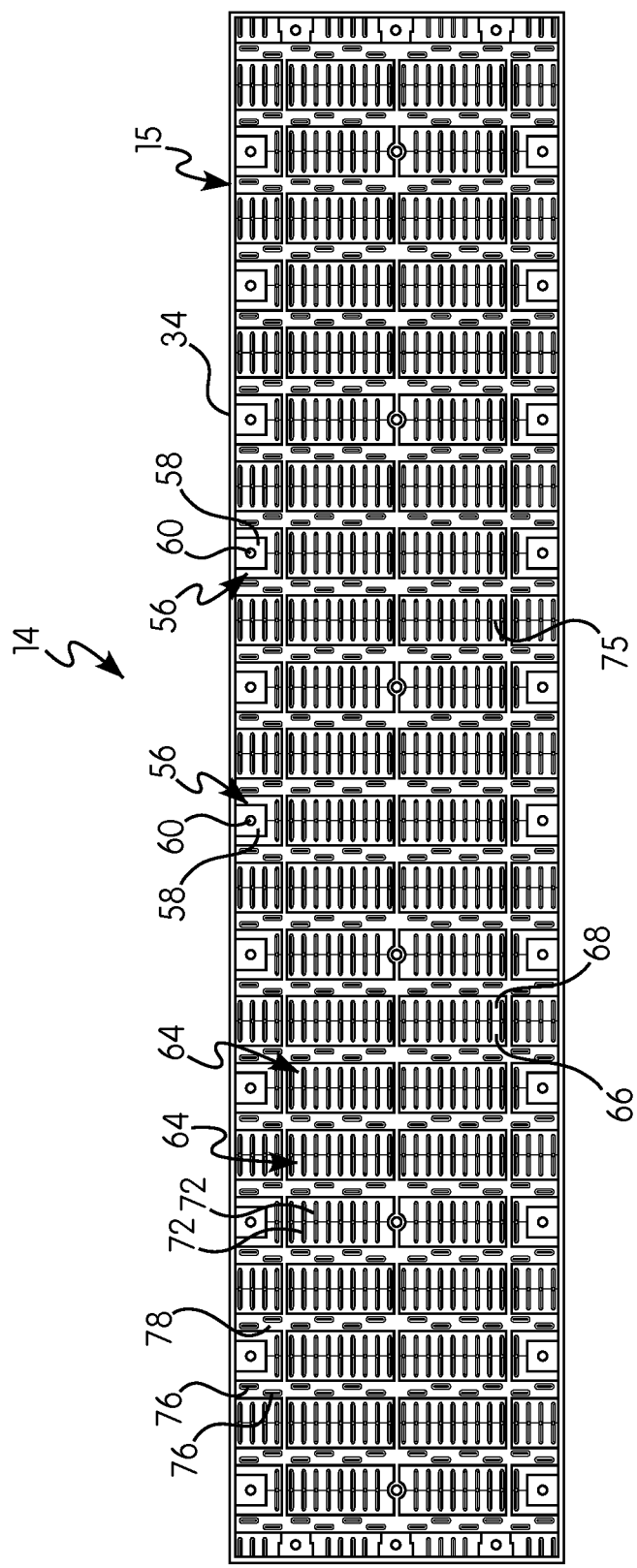
FIG. 5 is a top view of the filter media retainer shown in FIG. 4.
Figure 6:
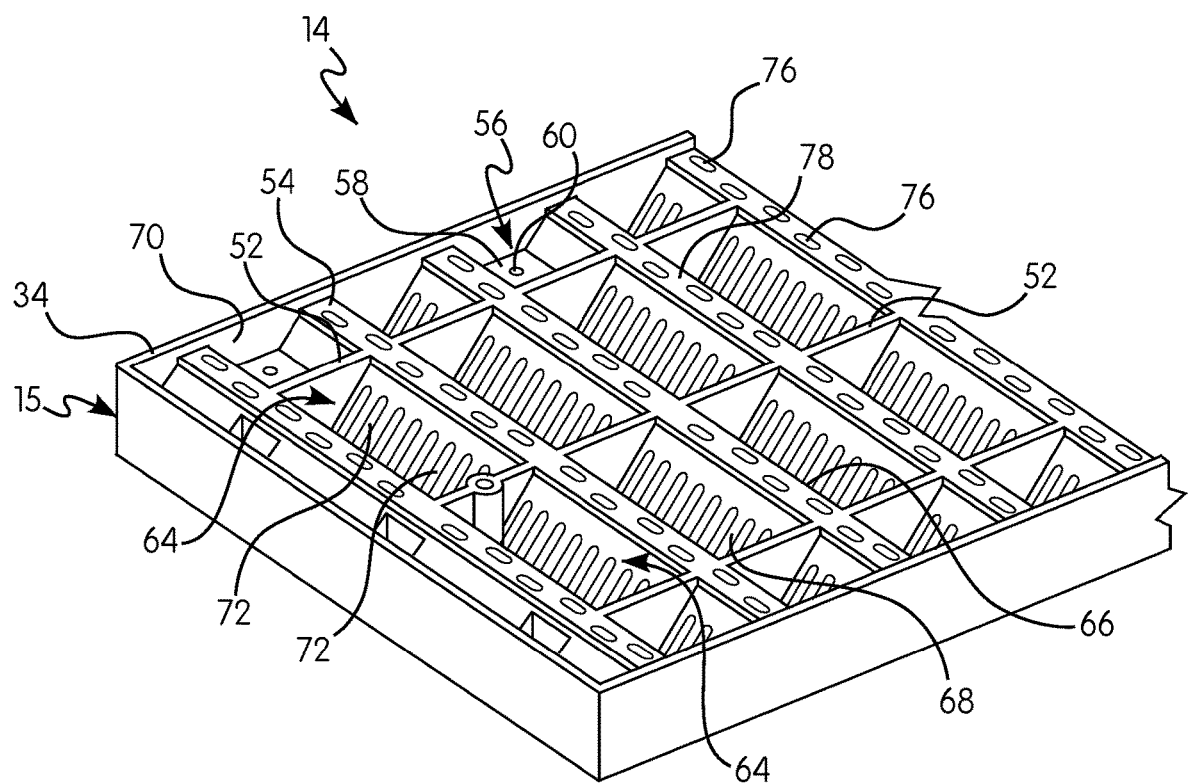
FIG. 6 is an enlarged perspective view of FIG. 5.

With reference to FIGS. 5-6, the plate 15 further includes a plurality of mounting portions 56 on the top surface 34 disposed along a periphery of the filter media retainer 14. In some examples, each mounting portion 56 has a top support surface 58 for supporting a first portion of a fastening element (not shown) and a mounting aperture 60 through which a second portion of the fastening element extends between the top surface 34 and the bottom surface 38 of the filter media retainer 14. Each mounting portion 56 may extend between the top surface 34 and the bottom surface 38 of the filter media retainer 14. A bottom support surface 59 of the mounting portion 56, shown in FIGS. 7-8, may be substantially coplanar with the bottom surface 38 of the filter media retainer 14 for supporting the filter media retainer 14 on the top wall 16 of the underdrain block 12 (shown in FIG. 2). In some examples, to connect the filter media retainer 14 to the underdrain block 12, the mounting aperture 60 of each mounting portion 56 is aligned with respective mounting holes 61 on a top surface of the underdrain block 12 (shown in FIG. 2). Next, the fastening elements 63 (shown in FIG. 2) may be inserted through each mounting aperture 60 and secured to the mounting holes 61 located in the top surface of the underdrain block 12 to connect the filter media retainer 14 to the underdrain block 12, as shown in FIG. 1.

Figure 9:
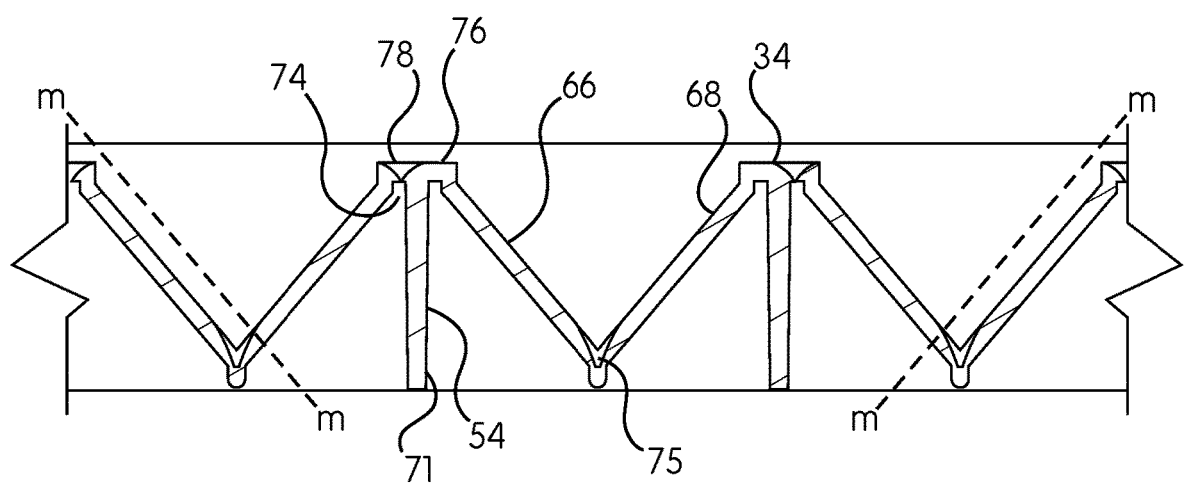
FIG. 9 is a detailed side cross-sectional view of the filter media retainer shown in FIG. 4.

With continued reference to FIGS. 5-6, the longitudinal ribs 52 and the transverse ribs 54 intersect to form a grid. In some examples, the grid defines a plurality of hopper-shaped compartments 64 defined between the ribs 52, 54. With reference to FIG. 9, each hopper-shaped compartment 64 generally includes a first sloped wall 66 and a second sloped wall 68, with each wall 66, 68 extending inwardly from the transverse ribs 54. In some examples, the hopper-shaped compartments 64 may have the same shape and size. In other examples, the hopper-shaped compartments 64 may have a different shape and/or size. In some examples, the mounting portions 56 may be positioned in the hopper-shaped compartments 64 next to the longitudinal sidewalls 50. For example, the mounting portions 56 may be positioned in each hopper-shaped compartment 64 next to the longitudinal sidewalls 50, or the mounting portions 56 may be positioned in a portion of the hopper-shaped compartments 64 next to the longitudinal sidewalls 50, such as every other hopper-shaped compartment 64.

Referring to FIG. 9, the sloped walls 66, 68 each comprise a slope m. In some examples, the first sloped wall 66 and second sloped wall 68 each have a slope m greater than 0° and less than 90°. In some examples, the slope m of first sloped wall 66 may be the same as the slope m of the second sloped wall 68. In other examples, the slope m of first sloped wall 66 may be different than the slope m of the second sloped wall 68.

In certain examples, at least one of the hopper-shaped compartments 64 have a height within a range of from 1 inch to 2 inches, such as a height of greater than 1 inch and less than 1½ inches. For example, the hopper-shaped compartments 64 can have a height of 1¼ inches. The height of the hopper-shaped compartments 64 is measured from the bottom of the first and second sloped walls 66, 68 to the top surface 34. At least one of the hopper-shaped compartments 64 may have a width within a range of from 1 inch to 4 inches, or from 1 inch to 3 inches, or from 1½ inches to 2½ inches, or from 1¾ inches to 2¼ inches. For example, the width of at least one of the hopper-shaped compartments 64 measured across the top surface 34 can be 2 inches.

Each hopper-shaped compartment 64 also includes opposing vertical walls 70 defined by the longitudinal ribs 52 or the longitudinal sidewalls 50. Opposing vertical walls 70 may be substantially perpendicular to a plane defined by the top surface 34 of the filter media retainer 14. In some examples, the opposing vertical walls 70 may be angled at a non-perpendicular angle relative to the plane defined by the top surface 34 of the filter media retainer 14. In such examples, the opposing vertical walls 70 may be angled in the same direction or opposite direction relative to the plane defined by the top surface 34 of the filter media retainer 14. Sloped walls 66, 68 and opposing vertical walls 70 together define each hopper-shaped compartment 64. The plurality of hopper-shaped compartments 64 together defines the filter media chamber 36 for containing and retaining the filter media.

With reference to FIG. 6 and FIG. 8, at least one of the first sloped wall 66 and the second sloped wall 68 has at least one first slot 72. In some examples, the first sloped wall 66 and the second sloped wall 68 each have a plurality of first slots 72. Each of the plurality of first slots 72 is configured to allow the passage of filtered water in a direction from the top surface 34 to the bottom surface 38 of the filter media retainer 14, as well as the passage of the backwash fluid (liquid and/or gas) in a direction from the bottom surface 38 to the top surface 34. In some examples, all of the first slots 72 may have an identical shape. In other examples, at least a portion of the first slots 72 may have a shape that is different from the shape of the remaining first slots 72.

In some examples, the first sloped wall 66 defines a first portion of the plurality of first slots 72, while the second sloped wall 68 defines a second portion of the plurality of first slots 72. In some examples, the first slots 72 on the first sloped wall 66 may be connected with the first slots 72 on the second sloped wall 68 at an intersection point 75 between the first sloped wall 66 and the second sloped wall 68, or at a base surface connecting a bottom of the first sloped wall 66 and the second sloped wall 68. In other examples, at least a portion of the first slots 72 on the first sloped wall 66 may be disconnected from at least a portion of the first slots 72 on the second sloped wall 68 at the intersection point 75 between the first sloped wall 66 and the second sloped wall 68. In some examples, as shown in FIG. 6 and FIG. 8, the first sloped wall 66 and second sloped wall 68 each define between 4 and 50 first slots 72 per 10 inch span (plate width). The number of first slots 72 is chosen depending on a particular application of the filter media retainer 14.

With continued reference to FIG. 6 and FIG. 8, the plurality of first slots 72 extend in a direction substantially parallel with the major longitudinal axis 48. In some examples, at least one of the plurality of first slots 72 may be angled relative to the major longitudinal axis 48 such that the at least one of the plurality of first slots 72 is not parallel with the major longitudinal axis 48. For example, at least one of the plurality of first slots 72 may extend in a direction substantially perpendicular relative to the major longitudinal axis 48. The plurality of first slots 72 may be divided into two or more groupings of first slots 72, wherein the first grouping of first slots 72 extends in a first direction relative to the major longitudinal axis 48, while a second grouping of first slots 72 extends in a second direction different than the first direction.

With continued reference to FIG. 6 and FIG. 8, a length of the first slots 72, as measured in a direction along the major longitudinal axis 48, may be substantially uniform across all of the first slots 72. In some examples, at least one of the plurality of first slots 72 may have a length that is different from the length of the remaining first slots 72. In various examples, the length of the first slots 72 may be within a range of from 0.125 inch to 2.0 inches. For example, the length of the first slots 72 measured across the top surface 34 may be 0.875 inches.

Figure 10A:
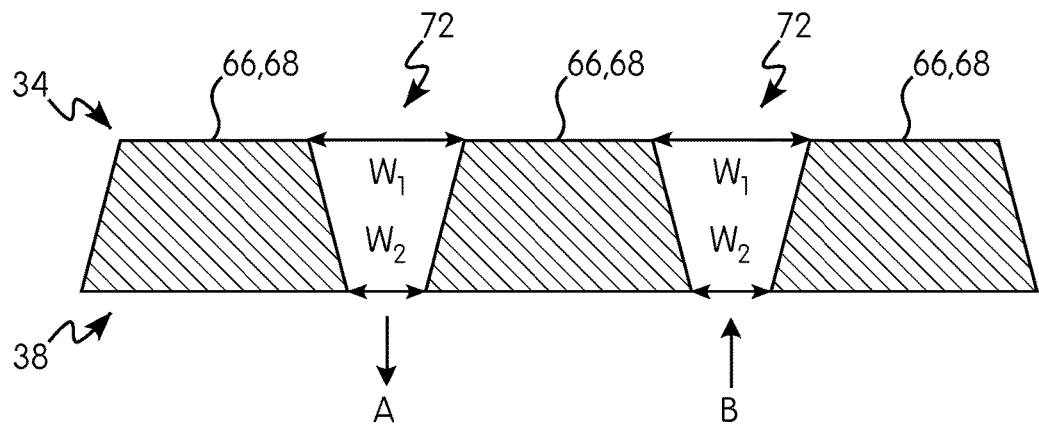
FIG. 10A is a cross-sectional view of first slots of the filter media retainer.

With continued reference to FIG. 6 and FIG. 8, a width of the first slots 72, as measured in a direction substantially perpendicular to the major longitudinal axis 48, may be substantially uniform across all of the first slots 72. In some examples, at least one of the plurality of first slots 72 may have a width that is different from the width of the remaining first slots 72. In some examples, the width of the first slots 72 on the surface of at least one of the first sloped wall 66 and the second sloped wall 68 visible from the bottom surface 38 of the filter media retainer 14 may be different than the width of the first slots 72 on the surface of at least one of the first sloped wall 66 and the second sloped wall 68 visible from the top surface 34 of the filter media retainer 14. For example, with reference to FIG. 10A, a width Wi of the first slots 72 on the top surface 34 can be larger than a width $W_2$ of the first slots 72 on the bottom surface 38 such that the first slots 72 have a substantially V-shaped structure. In some examples, the width of the first slots 72 can gradually change from the top surface 34 to the bottom surface 38. In some examples, the width of the first slots 72 may be within a range of from 0.002 inch to 0.400 inches. For example, the width of the first slots 72 may be 0.007 inches. In other examples, the width $W_1$ of the first slots 72 may be within a range of from 0.100 inch to 0.400 inches at the top surface 34, and the width $W_2$ may be within a range of from 0.002 inch to 0.100 inches at the bottom surface 38. The width $W_1$, $W_2$ of the first slots 72 is selected so as to prevent filter media from passing through filter media retainer 14 in a direction of arrow A in FIG. 10A during filtering operation, while not creating any significant head loss in the filter system 10 during backwashing operation in a direction of arrow B, thereby allowing for a desired flow velocity during backwashing. As shown in FIG. 10C, the first slots can have a uniform width in a direction from the top surface toward the bottom surface.

With reference to FIG. 6 and FIG. 8, adjacent hopper-shaped compartments 64 are separated from one another by a top sidewall 78. In some examples, the top sidewall 78 may be substantially co-planar with a plane defined by the top surface 34 of the filter media retainer 14. In some examples, at least one of the top sidewalls 78 separating the adjacent hopper-shaped compartments 64 may have at least one second slot 76 extending therethrough in a direction from the top surface 34 toward the bottom surface 38. For example, each of the top sidewalls 78 may have a plurality of second slots 76. Each second slot 76 is configured to allow the passage of filtered water in a direction from the top surface 34 to the bottom surface 38 of the filter media retainer 14, as well as the passage of the backwash fluid (liquid and/or gas) in a direction from the bottom surface 38 to the top surface 34. Each second slot 76 is further considered to prevent the passage of filter media therethrough. In some examples, all of the second slots 76 may have an identical shape. In other examples, at least a portion of the second slots 76 may have a shape that is different from the shape of the remaining second slots 76.

In some examples, as shown in FIG. 6 and FIG. 8, the top sidewall 78 has between 4 and 50 second slots 76 per 10 inch span (plate width). The number of second slots 76 is chosen depending on a particular application of the filter media retainer 14.

With continued reference to FIG. 6 and FIG. 8, the plurality of second slots 76 extend in a direction substantially perpendicular relative to the major longitudinal axis 48. In some examples, at least one of the plurality of second slots 76 may be angled relative to the major longitudinal axis 48 such that the at least one of the plurality of second slots 76 is not perpendicular relative to the major longitudinal axis 48. For example, at least one of the plurality of second slots 76 may extend in a direction substantially parallel relative the major longitudinal axis 48. The plurality of second slots 76 may be divided into two or more groupings of second slots 76, wherein the first grouping of the second slots 76 extends in a first direction relative to the major longitudinal axis 76, while a second grouping of the second slots 76 extends in a second direction different than the first direction. In some examples, the first grouping of the second slots 76 may be offset relative to the second grouping of the second slots 76 by a predetermined longitudinal and/or transverse distance to define a staggered arrangement of a plurality of second slots 76.

With continued reference to FIG. 6 and FIG. 8, a length of the second slots 76, as measured in a direction perpendicular to the major longitudinal axis 48, may be substantially uniform between all of the second slots 76. In some examples, at least one of the plurality of second slots 76 may have a length that is different from the length of the remaining second slots 76. In various examples, the length of the second slots 76 may be within a range of from 0.125 inch to 2.000 inches. For example, the length of the second slots 76 measured across the top surface 34 may be 0.375 inches.

Figure 10B:
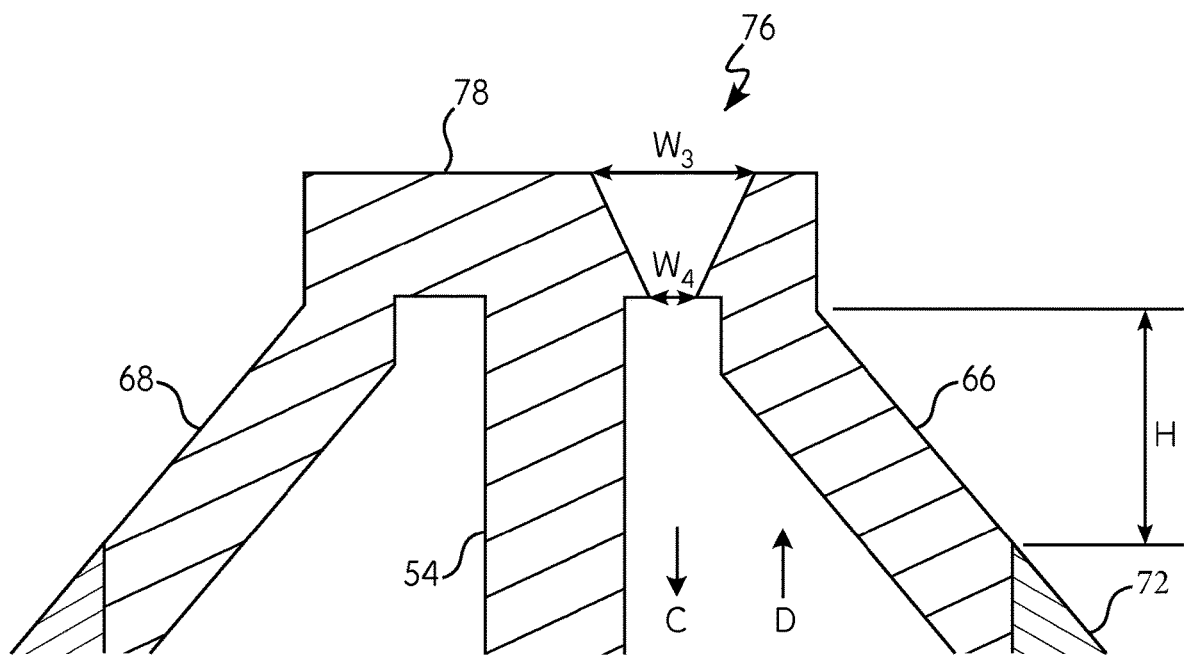
FIG. 10B is a cross-sectional view of second slots of the filter media retainer.
Figure 10C:
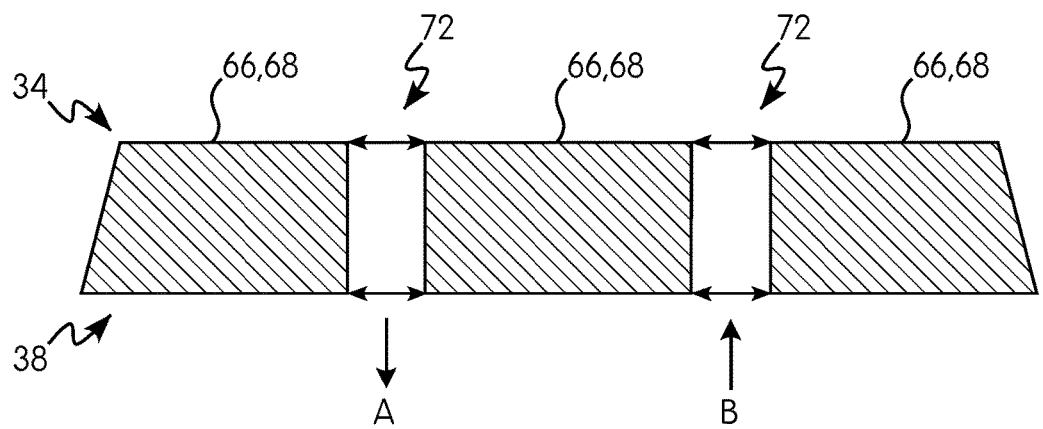
FIG. 10C is a cross-sectional view of another configuration of the first slots of the filter media retainer.
Figure 10D:
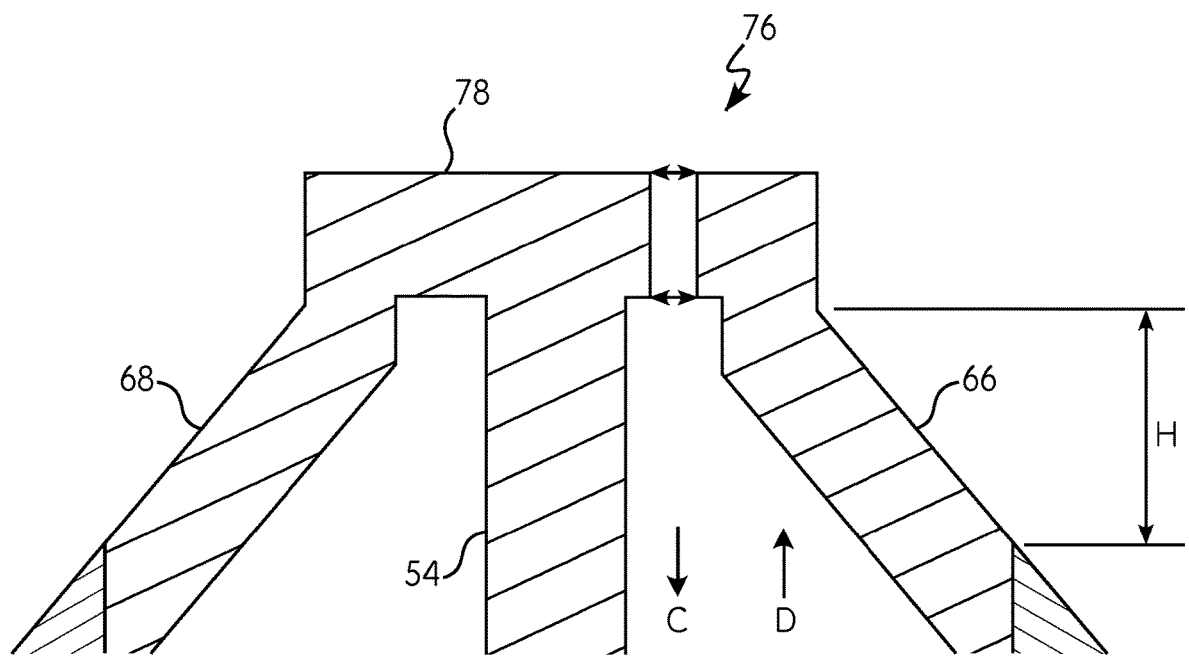
FIG. 10D is a cross-sectional view of another configuration of the second slots of the filter media retainer.

With reference to FIG. 10B, a width of the second slots 76, as measured in a direction substantially perpendicular to the major longitudinal axis 48, may be substantially uniform between all of the second slots 76. In some examples, at least one of the plurality of second slots 76 may have a width that is different from the width of the remaining second slots 76. In some examples, the width of the second slots 76 on the surface of the top sidewall 78 visible from the bottom surface 38 may be different than the width of the second slots 76 on the surface of the top sidewall 78 visible from the top surface 34. For example, with reference to FIG. 10B, a width $W_3$ of the second slots 76 can be wider on the top surface of the top sidewall 78 than a width $W_4$ on the bottom surface of the top sidewall 78, such that the second slots 76 have a substantially V-shaped structure. In some examples, the width of the second slots 76 can gradually change from the top surface to the bottom surface of the top sidewall 78. In some examples, the width of the second slots 76 may be within a range of from 0.004 inch to 0.400 inches. For example, the width of the second slots 76 may be 0.009 inches. In other examples, the width $W_3$ of the second slots 76 may be within a range of from 0.100 inch to 0.400 inches at the top surface of the top sidewall 78, and the width $W_4$ may be within a range of from 0.004 inch to 0.100 inches at the bottom surface of the top sidewall 78. The width $W_3$, $W_4$ of the second slots 76 is selected so as to prevent filter media from passing through the filter media retainer 14 in a direction of arrow C in FIG. 10B during filtering operation, while not creating any significant head loss in the filter system 10 during backwashing operation in a direction of arrow D, thereby allowing for a desired flow velocity during backwashing. As shown in FIG. 10D, the second slots can have a uniform width in a direction from the top surface toward the bottom surface.

With continued reference to FIG. 10B, the second slots 76 may be separated from the first slots 72 by a height H. In some examples, the height H may be measured from a bottom edge of the second slot 76 to a bottom edge of the top end of the first slot 72. The height H may be within a range of from 0.10 inches to 1.0 inches, such as about 0.40 inches. The height H is selected to improve air distribution to the second slots 76 during backwashing operation.

In some examples, a width of the second slots 76 is larger than a width of the first slots 72. In such examples, air will favor the second slots 76 due to lower surface tension. As such, while water passes through the first slots 72 and the second slots 76, air primarily passes through the second slots 76. The larger width of the second slots 76 produces a pressure differential which results in uniform air distribution during the backwashing operation. By using the filter media retainer 14 of the present invention, good air distribution through the filter media retainer 14 is achieved while keeping the pressure differential comparably low (e.g. approximately 12" of water column) for the passage of water, such as at a flow rate of 3 cubic feet per minute (equal to 22.44 gallon per minute) per square foot of the filter media retainer 14. The filter media retainer 14 also has sufficient strength to prevent distortion of the first and second slots 72, 76 during operation.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

The invention claimed is:

1. A filter media retainer comprising:
a plate having a first end wall, a second end wall, and a pair of longitudinal sidewalls connected to opposing sides of the first end wall and the second end wall, the plate having a top surface opposite a bottom surface;
a plurality of hopper-shaped compartments on the top surface and having a first sloped wall and a second sloped wall angled toward the first sloped wall in a direction from the top surface toward the bottom surface;
a top sidewall on the top surface of the plate separating adjacent hopper-shaped compartments from each other;
at least one first slot extending through at least one of the first sloped wall and the second sloped wall; and
at least one second slot extending through the top sidewall,
wherein the at least one first slot and the at least one second slot are configured to allow a passage of filtered water in a direction from the top surface to the bottom surface, and allow a passage of a backwash fluid in a direction from the bottom surface to the top surface.

2. The filter media retainer of claim 1, wherein the at least one first slot is a plurality of first slots, with a first portion of the plurality of first slots extending through the first sloped wall and a second portion of the plurality of first slots extending through the second sloped wall.

3. The filter media retainer of claim 2, wherein the first portion of the plurality of first slots is connected to the second portion of the plurality of first slots at an intersection point between the first sloped wall and the second sloped wall.

4. The filter media retainer of claim 2, wherein the first portion of the plurality of first slots is disconnected to the second portion of the plurality of first slots.

5. The filter media retainer of claim 1, wherein the at least one first slot extends in a direction substantially parallel relative to a major longitudinal axis of the plate.

6. The filter media retainer of claim 1, wherein the at least one first slot has a uniform width in a direction from the top surface toward the bottom surface.

7. The filter media retainer of claim 1, wherein a width of the at least one first slot on the bottom surface is smaller than a width of the at least one first slot on the top surface.

8. The filter media retainer of claim 1, wherein the at least one second slot extends in a direction substantially perpendicular relative to a major longitudinal axis of the plate.

9. The filter media retainer of claim 1, wherein the at least one second slot has a uniform width in a direction from the top surface toward the bottom surface.

10. The filter media retainer of claim 1, wherein a width of the at least one second slot on the bottom surface is smaller than a width of the at least one second slot on the top surface.

11. The filter media retainer of claim 1, wherein a width of the at least one first slot is smaller than a width of the at least one second slot.

12. The filter media retainer of claim 1, wherein the at least one first slot is separated from the at least one second slot by a distance of about 0.1 inches to about 1.0 inches in a height direction of the filter media retainer.

13. The filter media retainer of claim 1, wherein the at least one second slot is a plurality of second slots in a staggered arrangement along the top sidewall.

14. The filter media retainer of claim 1, further comprising at least one longitudinal rib extending between the first end wall and the second end wall in a direction substantially parallel with the pair of longitudinal sidewalls.

15. The filter media retainer of claim 1, further comprising at least one transverse rib extending between the pair of longitudinal sidewalls in a direction substantially parallel with the first end wall and the second end wall.

16. The filter media retainer of claim 1, further comprising a plurality of mounting portions on the top surface and disposed along a periphery of the plate.

17. A filter system for filtering a liquid containing particles, the filter system comprising:
   a) an underdrain block comprising a top wall, a bottom wall, and a pair of side walls extending between the top wall and the bottom wall to define an interior chamber, and
   b) a filter media retainer mountable on the top wall of the underdrain, the filter media retainer comprising:
      a plate having a first end wall, a second end wall, and a pair of longitudinal sidewalls connected to opposing sides of the first end wall and the second end wall, the plate having a top surface opposite a bottom surface;
      a plurality of hopper-shaped compartments on the top surface and having a first sloped wall and a second sloped wall angled toward the first sloped wall in a direction from the top surface toward the bottom surface;
      a top sidewall on the top surface of the plate separating adjacent hopper-shaped compartments from each other;
      at least one first slot extending through at least one of the first sloped wall and the second sloped wall; and
      at least one second slot extending through the top sidewall,
      wherein the at least one first slot and the at least one second slot are configured to allow a passage of filtered water in a direction from the top surface to the bottom surface, and allow a passage of a backwash fluid in a direction from the bottom surface to the top surface.

18. The filter system of claim 17, wherein the top wall of the underdrain block has a plurality of dispersion apertures that are in fluid communication with the at least one first slot and the at least one second slot of the filter media retainer.

19. The filter system of claim 18, wherein filter media retainer comprises at least one rib positioned over at least one of the plurality of dispersion apertures to direct backwash fluid to the at least one first slot and the at least one second slot.

20. The filter system of claim 17, wherein a width of the at least one first slot on the bottom surface is smaller than a width of the at least one first slot on the top surface.

21. The filter system of claim 17, wherein a width of the at least one second slot on the bottom surface is smaller than a width of the at least one second slot on the top surface.

22. The filter system of claim 17, wherein a width of the at least one first slot is smaller than a width of the at least one second slot.

23. The filter system of claim 17, wherein the at least one first slot is separated from the at least one second slot by a distance of about 0.1 inches to about 1.0 inches in a height direction of the filter media retainer.

\* \* \* \* \*